June 23, 1942.   A. A. TOGESEN ET AL   2,287,502
ELECTRICAL DISTRIBUTION SYSTEM
Filed June 12, 1941   5 Sheets-Sheet 2

INVENTOR.
Alva A. Togesen and
BY Lawrence E. Fisher

Daniel G. Cullen

June 23, 1942.　　　A. A. TOGESEN ET AL　　　2,287,502
ELECTRICAL DISTRIBUTION SYSTEM
Filed June 12, 1941　　　5 Sheets-Sheet 5

INVENTOR.
Alva A. Togesen and
BY Lawrence E. Fisher

Daniel G. Cullen

Patented June 23, 1942

2,287,502

UNITED STATES PATENT OFFICE 2,287,502

ELECTRICAL DISTRIBUTION SYSTEM

Alva A. Togesen and Lawrence E. Fisher, Detroit, Mich., assignors to Bulldog Electric Products Company, Detroit, Mich., a corporation of West Virginia Application June 12, 1941, Serial No. 397,720

31 Claims. (Cl. 171—97)

This application relates to electrical distribution systems and more particularly to systems of the bus bar type.

Aims and objects of the invention disclosed herein will best be understood upon reference to the following detailed description, relating to the appended drawings. In these drawings.

Detailed description

Figure 1:
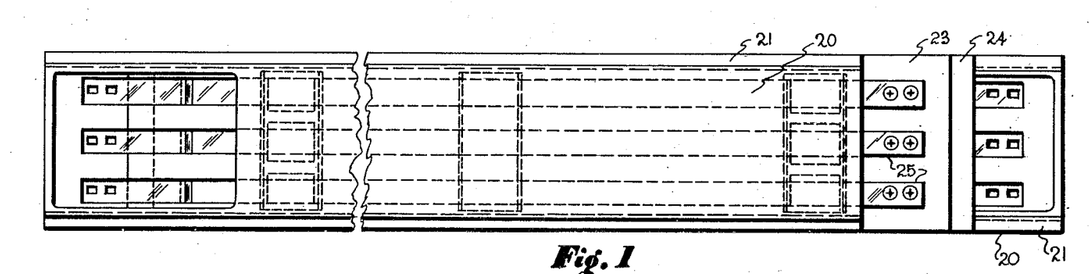
Figs. 1, 2 and 3 shows a unit length of bus duct of the system in top plan, side and end views respectively.
Figure 2:
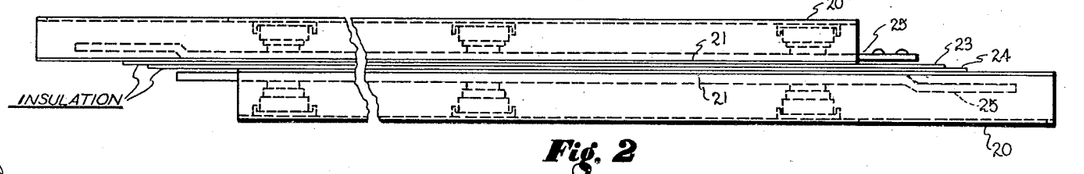
Figure 3:
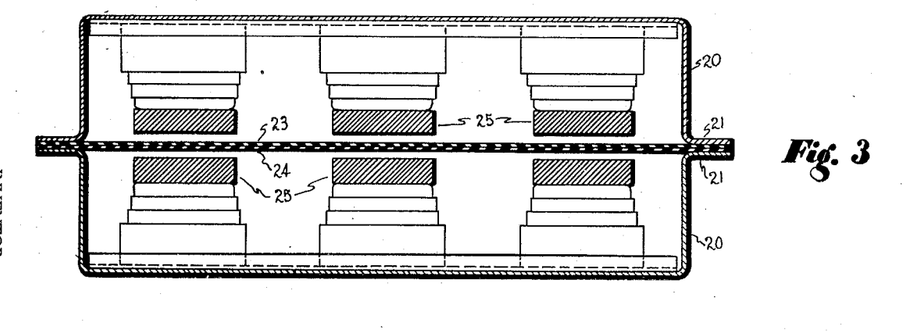
Figure 8:
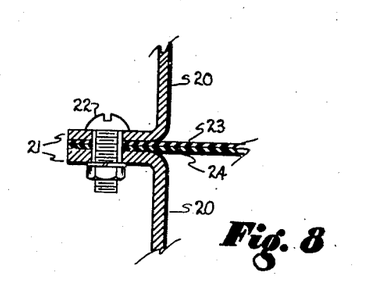
Fig. 8 shows a duct seam in detail.

The unit length of bus duct disclosed in Figs. 1 to 3 is to be joined end to end to another to form a bus duct run. It consists of two long bus duct sections of which the duct sections are the channels 20, arranged edge to edge to form a casing, with each edge outwardly flanged as at 21, the channels projecting beyond one another at ends to provide lap scarf joints. Between the channels and thus closing them and isolating them from each other, and disposed between the flanges 21 so as to be held in place by the casing joining bolts 22, (Fig. 8), is an insulation barrier means which is in the form of two sheets 23—24 of insulation, as shown, secured to the channels individually to form individual closures for them. Bus bars 25 are within the channels.

Figure 4:
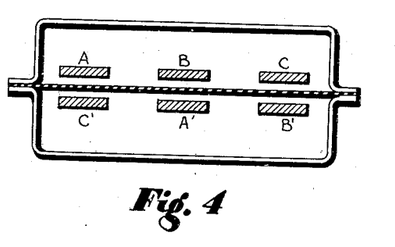
Fig. 4 is a diagrammatic end view in accordance with Fig. 3.

An important feature of the system herein shown is the novel inter-relation of bus bars, shown for example in Fig. 3 and diagrammatically in Fig. 4. Referring particularly to Fig. 4, it will be seen that the duct therein shown includes six bus bars of which the two bus bars A and A' form one phase, B and B' another phase and C and C' a third phase. The bus bars are so arranged as to form pairs A—C', B—A' and C—B', and the bus bars of a pair are relatively close to each other. For example, bus A is very close to bus C', bus B is close to bus A', and bus C is close to bus B'.

However, the pairs are relatively far apart. For example, the pair A'B is far from the pair AC' and from the pair C—B'. Further, the conductors are arranged in two definite and distinct groups, A B C, $A^1 B^1 C^1$, (Fig. 4), with each group including one conductor from each of three phases.

The fact that the bus bars within a pair are close to each other is to a large extent responsible for a considerable reduction of voltage drop in the system. The close spacing of the bus bars has been found effective to reduce the reactance and bus bar systems having the bus bars close to each other can be considered to be of the Lo-reactance type.

However, the provision of wide spaces between the pairs provides access into the duct between the pairs for joining or mounting or for any other desired purposes.

It has been considered that because the pairs are far apart, the system herein shown may well be considered as a parallel system of single phase distribution and this analysis might be helpful here. For example the current flow in bus A (Fig. 4) is equal in value and opposite in vector relation to that in bus $C^1$, and that holds true of bus B vs. bus $A^1$, and bus C vs. $B^1$. This is a typical characteristic of single phase transmission and affords a basis for our conclusion that our system is a single transmission of three phase current.

Particularly in connection with the distribution of alternating current, the problem of reactance loss or voltage drop is great and the system herein shown is useful particularly in such distribution and a great advantage is obtained by the relatively close spacing of the bus bars within the pair.

Further, great spaces between the pairs provides a large air circulation area, and makes it possible to have radiation of heat from the pairs.

The bus bars herein shown are thin and wide and this is also helpful in reducing losses particularly in the distribution of alternating current.

The provision of closely spaced bus bars within the pairs, effects a reduction of the magnetic field and permits the use of steel for the casing with no sacrifice of reactance drop, heretofore compensated for by the use of aluminum as part of the casing.

Figure 5:
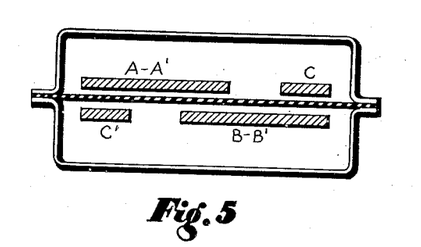
Fig. 5 is a similar view of a four-bus bar modification.

Fig. 5 shows a variation of the system. Whereas in Fig. 4, the bus duct is shown as including six bus bars arranged as indicated, the system shown in Fig. 5 includes but four bus bars, two of which are of double size so as to form the equivalent of six bus bars and the arrangement of bus bars consequently, following that of Fig. 4, permits all of the desired results to be obtained with the use of but four bus bars, rather than with six. Thus bus bars A and A' are merged into one, as are bus bars B and B'. Bus bars C and C' are, of course, not merged in the arrangement shown.

Figure 6:
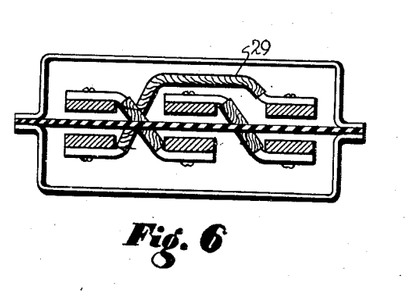
Figs. 6 and 7 illustrate arrangements for joining pairs of bus bars and for providing tap-offs, in the system of Figs. 1 to 3.

Arrangements for tieing together bus bars are indicated in Fig. 6 where the bus bars are shown tied together by tie straps 29.

Figure 7:
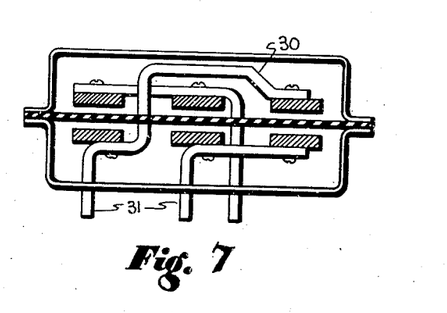

For tapping off at suitable points, the arrangement suggested by Fig. 7 might well be employed. This arrangement includes straps 30 properly connected to the bus bars for tieing them together and having extensions 31 projecting out of the duct for providing tapoff.

Figure 9:
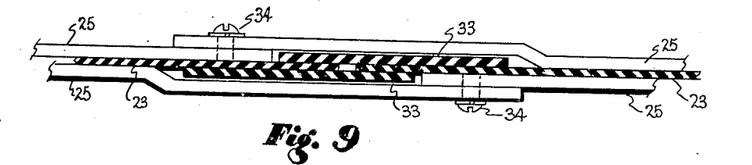
Figs. 9 and 10 show two different arrangements for joining bus bars end to end.
Figure 10:
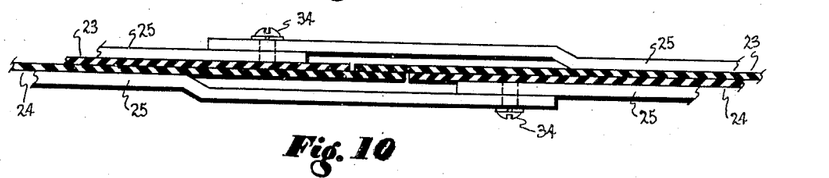

Figs. 9-10 show a novel arrangement for providing end to end joints for bus bars which are separated by insulation barriers. Fig. 9 shows two rows of bus bars 25 which form upper and lower rows of bus bars in a single unit length of bus duct. These rows are to be joined relatively end to end to other rows of bus bars, which also form upper and lower rows of bus bars of another unit length of bus duct. Between each row of bus bars is an insulation sheet, such as shown at 23. By offsetting the ends of the bus bars of one row, as indicated, and by the proper use of filler pieces 33 of insulation, an efficient and satisfactory and easily manipulable joint is provided. Bolts 34 thread into the bus bars to effect the joint.

Fig. 10 shows a similar arrangement but employing two sheets of insulation 23—24 between the rows of bus bars in a unit length of bus duct. This arrangement eliminates the necessity for using the filler pieces 33 and contemplates lapping of insulation sheets at a joint.

Figure 11:
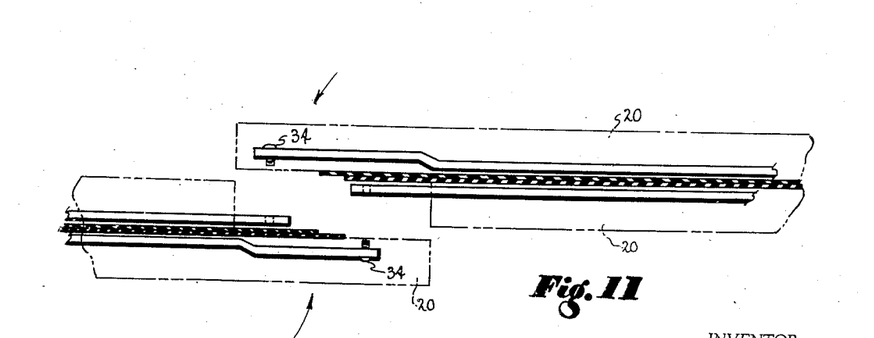
Fig. 11 shows an arrangement for joining unit lengths of bus duct end to end, using bus bar joints of the type shown in Figs. 9 and 10.

Fig. 11 shows how the arrangement of Fig. 10 is utilized in connection with the duct sections that cooperate with the bus bar sections to form a unit length of bus duct. The duct sections each comprise an upper channel as well as a lower channel, with one of the channels projecting beyond the other at an end as indicated, to form a lap scarf joint. The joining bolts 34 for joining the bus bars, have their axes perpendicular to the meeting plane of the duct and this is parallel to the meeting plane of the bus bars: thus it is possible to move the end of one bus duct length to another in the direction indicated by the arrows, which is of convenience particularly in the event a long run of bus duct is being assembled where a unit length has one end anchored, while to the other end is being joined an end of a free unit length of bus duct.

Figure 12:
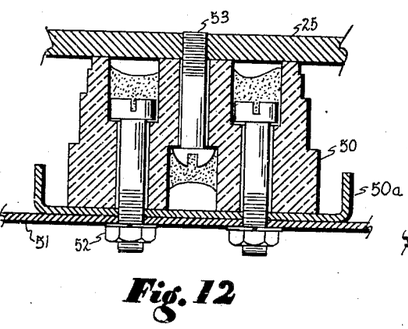
Figs. 12 and 13 show two different arrangements for mounting bus bars in duct.
Figure 13:
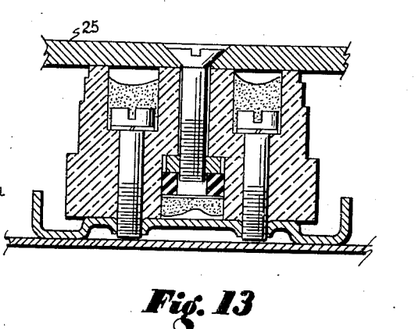

Pedestal type insulators 50, disposed within and secured to transverse strips 50—A, as shown in Figs. 12 or 13, for example, secured to the webs 51 of the channels either by bolts 52, as in Fig. 12, or by welding, as shown in Fig. 13, receive screws 53 for mounting the bus bars 25, laid flat on the pedestals and disposed with their flat surfaces parallel to and close to the insulation barrier means 23—24.

Figure 14:
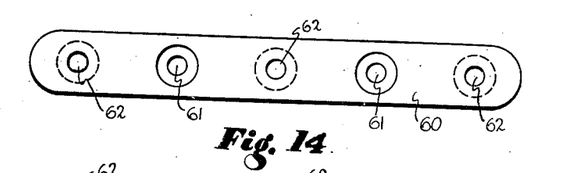
Figs. 14 and 15 are plan and side views of an insulator support for three bus bars.
Figure 15:
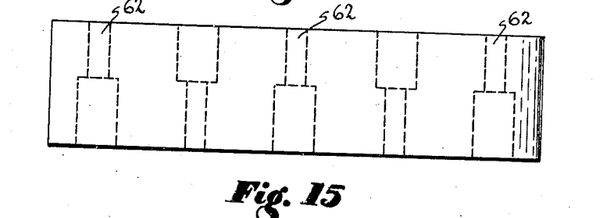
Figure 16:
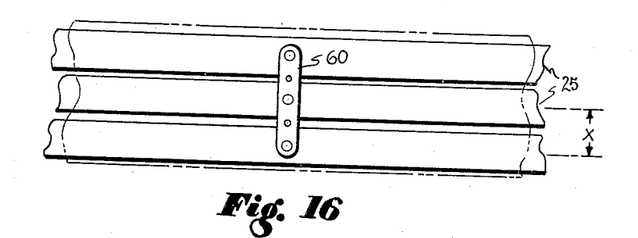
Figs. 16 to 18 show the support of Figs. 14-15 in use with three different relative spacings of bus bars.
Figure 17:
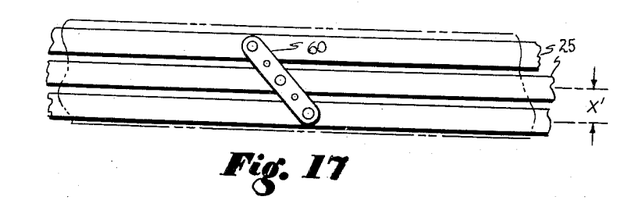
Figure 18:
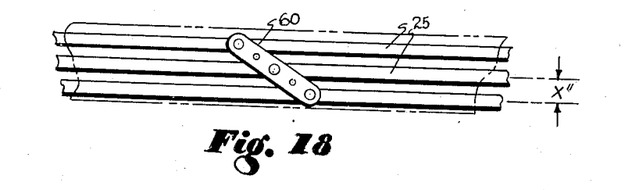

Figs. 14 to 15 illustrate another form of insulator support for bus bars and Figs. 16 to 18 indicate its use. The insulator here shown consists of a single bar or strap 60 of insulating material having two holes 61 between its ends for receiving bolts for securing it to a duct and having three holes 62 for receiving bolts which secure bus bars to the insulator. The spacing of the various holes has been properly designed so as to enable the insulator to be used as a support for three different spacings of bus bars as shown in Figs. 16-18. For example Fig. 16 shows an arrangement employed in a 2500 amp. bus bar system where the center to center distance X between bus bars is 7 inches. Fig. 17 shows an arrangement for a 1500 amp. bus bar system where the distance X was 5 inches. Fig. 18 shows an arrangement used in a 500 amp. system where the distance X was 3 inches.

Figure 19:
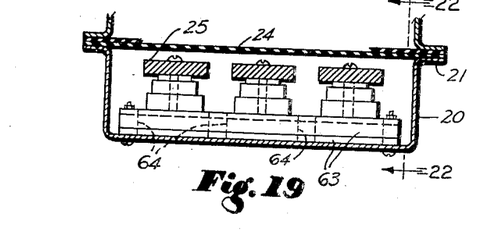
Figs. 19 and 20 show a modified arrangement for supporting bus bars in duct.
Figure 20:
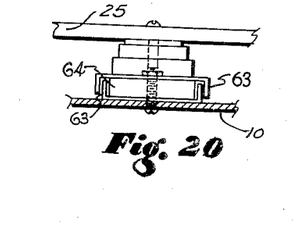

Figs. 19 and 20 show still another arrangement for supporting bus bars in duct. In this arrangement each support consists of two narrow channels 63 telescoped on each other and extending across the duct for its full width and being secured to the duct by suitable screws.

Within the space between the channels are three insulation blocks 64 and above these blocks are three pedestals each of which supports a bus bar. The supporting screws for the bus bars thread through the pedestals and into the insulation blocks, these having nuts imbedded within them for receiving the screws. On the other hand, the screws might well have their heads within the insulation blocks and their shanks threaded through the pedestals and into the bus bars.

Figure 21:
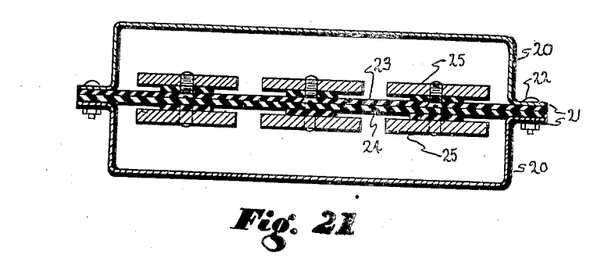
Fig. 21 shows how bus bars may be supported by the barriers, rather than by the casing.

Fig. 21 shows the bus bars supported by suitable screws from the barrier sheets 23—24, rather than from the channels.

An important feature of the system herein shown is the ease of assembly of the bus duct, both from the point of view of assembling a unit length during manufacture, and from the point of view of assembling unit lengths end to end to form an installation. It will be seen that the bus duct as a whole is made up of unit lengths. Each unit length is longitudinally split to comprise separate and distinct individually complete complementary bus duct sections, an upper one and a lower one, these being disposed alongside each other and interjoined at their longitudinally extending meeting edges or flanges. Each bus duct section of a unit length comprises a unit length of duct or channel, a unit length of bus bar or bus bars, depending upon how many bus bars are within the duct, and its own individual means for supporting the bus bar length or lengths in the duct lengths, free and independent of any part of the complementary bus duct sections. The construction is such that before two complementary bus duct sections are brought adjacent each other and interjoined each bus duct section is complete with its duct or channel, its bus bar or bus bars and its bus bar supporting means. The assembly of a unit length is completed simply by interjoining the bus duct sections.

Each bus duct section may be seen to comprise an open pan or channel of U cross section whose open side is closed by its own individual insulation closure. The closures of two pans or channels, though separate and distinct and separately supported, are adjacent when the bus duct sections are interjoined and each bus bar is thus disposed in a confined space between the bight of its pan or channel and the insulation closure and each bus bar is supported by the pan or channel, rather than by the closure.

Now having described the bus duct system herein disclosed, reference should be had to the claims which follow for a determination of the inventions thereof.

We claim:

1. An electrical distribution system comprising an elongated distributor made up of lengths joined end to end, each length of distributor comprising a casing made of elongated parts joined longitudinally on meeting lines, with certain of the parts overlapping the others at one end of the casing length and underlapping the others at the other end of the casing length, whereby casing lengths are joined end to end by scarf lap joints, each length of distributor also comprising conductor lengths within the casing length and substantially coterminous therewith, the conductor lengths of one distributor length being arranged to lap over conductor lengths of another distributor length when the two distributor lengths are joined end to end, the lapping planes of the conductor lengths being parallel to the lapping planes of the casing lengths, whereby the conductor lengths and the casing length of a distributor length may be moved simultaneously and in the same direction for end to end joining to the corresponding parts of an installed distributor length.

2. An electrical distribution system comprising an elongated distributor made up of lengths joined end to end, each length of distributor comprising a casing made of elongated parts joined longitudinally on meeting lines, with certain of the parts overlapping the others at one end of the casing length and underlapping the others at the other end of the casing length, whereby casing lengths are joined end to end by scarf lap joints, each length of distributor also comprising conductor lengths within the casing length and substantially coterminous therewith, the conductor lengths of one distributor length being arranged to lap over conductor lengths of another distributor length when the two distributor lengths are joined end to end, the lapping planes of the conductor lengths being parallel to the lapping planes of the casing lengths, whereby the conductor lengths and the casing length of a distributor length may be moved simultaneously and in the same direction for end to end joining to the corresponding parts of an installed distributor length, there being, in each casing length, two rows of conductor lengths, a plurality to each row, with the plane of each row being parallel to the said meeting planes.

3. An electrical distribution system comprising an elongated distributor made up of lengths joined end to end, each length of distributor comprising a casing made of elongated parts joined longitudinally on meeting lines, with certain of the parts overlapping the others at one end of the casing length and underlapping the others at the other end of the casing length, whereby casing lengths are joined end to end by scarf lap joints, each length of distributor also comprising conductor lengths within the casing length and substantially coterminous therewith, the conductor lengths of one distributor length being arranged to lap over conductor lengths of another distributor length when the two distributor lengths are joined end to end, the lapping planes of the conductor lengths being parallel to the lapping planes of the casing lengths, whereby the conductor lengths and the casing length of a distributor length may be moved simultaneously and in the same direction for end to end joining to the corresponding parts of an installed distributor length, the parts of each casing length comprising two identical channels arranged with their open sides adjacent, one offset longitudinally with respect to the other.

4. An electrical distribution system comprising an elongated distributor made up of lengths joined end to end, each length of distributor comprising a casing made of elongated parts joined longitudinally on meeting lines, with certain of the parts overlapping the others at one end of the casing length and underlapping the others at the other end of the casing length, whereby casing lengths are joined end to end by scarf lap joints, each length of distributor also comprising conductor lengths within the casing length and substantially coterminous therewith, the conductor lengths of one distributor length being arranged to lap over conductor lengths of another distributor length when the two distributor lengths are joined end to end, the lapping planes of the conductor lengths being parallel to the lapping planes of the casing lengths, whereby the conductor lengths and the casing length of a distributor length may be moved simultaneously and in the same direction for end to end joining to the corresponding parts of an installed distributor length, the parts of each casing length comprising two identical channels arranged with their open sides adjacent, one offset longitudinally with respect to the other, there being, in each casing length, two rows of conductor lengths, a plurality to each row, with the plane of each row being parallel to the said meeting planes, each channel containing one of the two rows of conductor lengths, with the lapping part of each conductor length being between the adjacent ends of the two channels of a casing length.

5. In a polyphase distribution system, a source of polyphase alternating current, a plurality of wide thin conductors connected thereto and arranged in remotely spaced definite and distinct pairs, each pair comprising two evenly and closely spaced conductors of different phases, arranged wide face near wide face, each phase comprising two conductors of different pairs, the relative arrangement of and the spacing between the two conductors of a pair being small enough to permit the currents in the conductors of the pair to neutralize their relative magnetic effects but the spacing being large enough to provide adequate relative insulated clearance between the conductors of the pair, the spacing between the pairs being large enough to provide adequate heat dissipation from the pairs and satisfactory access between the pairs for tools and hands and fasteners used in joining and supporting the conductors, the spacing between pairs being considerably greater than the spacing between conductors of a pair, and a casing surrounding the conductors and having wide thin heat radiating surfaces close to and parallel to the wide surfaces of the conductor.

6. In a polyphase distribution system, a source of polyphase alternating current, a plurality of wide thin conductors connected thereto and arranged in remotely spaced definite and distinct pairs, each pair comprising two evenly and closely spaced conductors of different phases, arranged wide face near wide face, each phase comprising two conductors of different pairs, the relative arrangement of and the spacing between the two conductors of a pair being small enough to permit the currents in the conductors of the pair to neutralize their relative magnetic effects but the spacing being large enough to provide adequate relative insulated clearance between the conductors of the pairs, the spacing between the pairs being large enough to provide adequate heat dissipation from the pairs and satisfactory access between the pairs for tools and hands and fasteners used in joining and supporting the conductors, the spacing between pairs being considerably greater than the spacing between conductors of a pair, the several conductors being arranged in two groups, each group comprising a conductor from each of the phases, each pair including a conductor from each of the groups, and a casing surrounding the conductors and having wide thin heat radiating surfaces close to and parallel to the wide surfaces of the conductors.

7. In a polyphase distribution system, a source of polyphase alternating current, a plurality of wide thin conductors connected thereto and arranged in remotely spaced definite and distinct pairs, each pair comprising two evenly and closely spaced conductors of different phases, arranged wide face near wide face, each phase comprising two conductors of different pairs, the relative arrangement of and the spacing between the two conductors of a pair being small enough to permit the currents in the conductors of the pair to neutralize their relative magnetic effects but the spacing being large enough to provide adequate relative insulated clearance between the conductors of the pair, the spacing between the pairs being large enough to provide adequate heat dissipation from the pairs and satisfactory access between the pairs for tools and hands and fasteners used in joining and supporting the conductors, the spacing between pairs being considerably greater than the spacing between conductors of a pair, the several conductors being arranged in two rows, each row comprising a conductor from each of the phases, each pair including a conductor from each of the rows, with the conductors of one row directly above those of the other, and a casing surrounding the conductors and having wide thin heat radiating surfaces close to and parallel to the wide surfaces of the conductors.

8. In a polyphase distribution system, a source of polyphase alternating current, a plurality of wide thin conductors connected thereto and arranged in remotely spaced definite and distinct pairs, each pair comprising two evenly and closely spaced conductors of different phases, arranged wide face near wide face, each phase comprising two conductors of different pairs, the relative arrangement of and the spacing between the two conductors of a pair being small enough to permit the currents in the conductors of the pair to neutralize their relative magnetic effects but the spacing being large enough to provide adequate relative insulated clearance between the conductors of the pair, the spacing between the pairs being large enough to provide adequate heat dissipation from the pairs and satisfactory access between the pairs for tools and hands and fasteners used in joining and supporting the conductors, the spacing between pairs being considerably greater than the spacing between conductors of a pair, the several conductors being arranged in two rows, each row comprising a conductor from each of the phases, each pair including a conductor from each of the rows, with the conductors of one row directly above those of the other, and an insulation barrier between the two rows of conductors, and a casing surrounding the conductors and having wide thin heat radiating surfaces close to and parallel to the wide surfaces of the conductors.

9. In a polyphase distribution system, a source of polyphase alternating current, a plurality of wide thin conductors connected thereto and arranged in remotely spaced definite and distinct pairs, each pair comprising two evenly and closely spaced conductors of different phases, arranged wide face near wide face, each phase comprising two conductors of different pairs, the relative arrangement of and the spacing between the two conductors of a pair being small enough to permit the currents in the conductors of the pair to neutralize their relative magnetic effects but the spacing being large enough to provide adequate relative insulated clearance between the conductors of the pair, the spacing between the pairs being large enough to provide adequate heat dissipation from the pairs and satisfactory access between the pairs for tools and hands and fasteners used in joining and supporting the conductors, the spacing between pairs being considerably greater than the spacing between conductors of a pair, each pair carrying current in substantially equal amounts and of opposite directions, thus comprising a single phase transmission means, and a casing surrounding the conductors and having wide thin heat radiating surfaces close to and parallel to the wide surfaces of the conductors.

10. In a polyphase distribution system, a source of polyphase alternating current, a plurality of wide thin conductors connected thereto and arranged in remotely spaced definite and distinct pairs, each pair comprising two evenly and closely spaced conductors of different phases, arranged wide face near wide face, each phase comprising two conductors of different pairs, the relative arrangement of and the spacing between the two conductors of a pair being small enough to permit the currents in the conductors of the pair to neutralize their relative magnetic effects but the spacing being large enough to provide adequate relative insulated clearance between the conductors of the pair, the spacing between the pairs being large enough to provide adequate heat dissipation from the pairs and satisfactory access between the pairs for tools and hands and fasteners used in joining and supporting the conductors, the spacing between pairs being considerably greater than the spacing between conductors of a pair, each conductor being a flat bar, and a casing surrounding the conductors and having wide thin heat radiating surfaces close to and parallel to the wide surfaces of the conductors.

11. In a polyphase distribution system, a source of polyphase alternating current, a plurality of wide thin conductors connected thereto and arranged in remotely spaced definite and distinct pairs, each pair comprising two evenly and closely spaced conductors of different phases, arranged wide face near wide face, each phase comprising two conductors of different pairs, the relative arrangement of and the spacing between the two conductors of a pair being small enough to permit the currents in the conductors of the pair to neutralize their relative magnetic effects but the spacing being large enough to provide adequate relative insulated clearance between the conductors of the pair, the spacing between the pairs being large enough to provide adequate heat dissipation from the pairs and satisfactory access between the pairs for tools and hands and fasteners used in joining and supporting the conductors, the spacing between pairs being considerably greater than the spacing between conductors of a pair, each pair carrying current in substantially equal amounts and of opposite directions, thus comprising a single phase transmission means, each conductor being a flat bar, and a casing surrounding the conductors and having wide thin heat radiating surfaces close to and parallel to the wide surfaces of the conductors.

12. In a polyphase distribution system, a source of polyphase alternating current, a plurality of wide thin conductors connected thereto and arranged in remotely spaced definite and distinct pairs, each pair comprising two evenly and closely spaced conductors of different phases, arranged wide face near wide face, each phase comprising two conductors of different pairs, the relative arrangement of and the spacing between the two conductors of a pair being small enough to permit the currents in the conductors of the pair to neutralize their relative magnetic effects but the spacing being large enough to provide adequate relative insulated clearance between the conductors of the pair, the spacing between the pairs being large enough to provide adequate heat dissipation from the pairs and satisfactory access between the pairs for tools and hands and fasteners used in joining and supporting the conductors, the spacing between pairs being considerably greater than the spacing between conductors of a pair, the several conductors being arranged in two rows, each row comprising a conductor from each of the phases, each pair including a conductor from each of the rows, with the conductors of one row directly above those of the other, and a casing surrounding the conductors and having wide thin heat radiating surfaces close to and parallel to the wide surfaces of the conductors, the casing being split longitudinally on a plane passing between the two rows of conductors so that each row of conductors may be mechanically associated with a casing portion length.

13. In a distribution system, a source of alternating current, a plurality of wide thin conductors connected thereto and arranged in a pattern of a plurality of definite and distinct pairs, each pair comprising two evenly and closely spaced conductors carrying currents of different phases, arranged wide face near wide face, the relative arrangement of and the spacing between the two conductors of a pair being small enough to permit the magnetic field effects of the currents in the conductors of the pair to neutralize one another, but the spacing being large enough to provide adequate relative insulated clearance between the conductors of the pair, and a casing surrounding the conductors and having wide thin heat radiating surfaces close to and parallel to the wide surfaces of the conductors.

14. In a distribution system, a source of alternating current, a plurality of wide thin conductors connected thereto and arranged in a pattern of a plurality of definite and distinct pairs, each pair comprising two evenly and closely spaced conductors carrying currents of different phases, arranged wide face near wide face, the relative arrangement of and the spacing between the two conductors of a pair being small enough to permit the magnetic field effects of the currents in the conductors of the pair to neutralize one another, but the spacing being large enough to provide adequate relative insulated clearance between the conductors of theh pair, the alternating current source being polyphase, with each phase distributed over two pairs, there being as many pairs as phases, and a casing surrounding the conductors and having wide thin heat radiating surfaces close to and parallel to the wide surfaces of the conductors.

15. In a distribution system, a source of alternating current, a plurality of wide thin conductors connected thereto and arranged in a pattern of a plurality of definite and distinct pairs, each pair comprising two evenly and closely spaced conductors carrying currents of different phases, arranged wide face near wide face, the relative arrangement of and the spacing between the two conductors of a pair being small enough to permit the magnetic field effects of the currents in the conductors of the pair to neutralize one another, but the spacing being large enough to provide adequate relative insulated clearance between the conductors of the pair, the pairs being remotely spaced whereby there is a minimum of interpair magnetic effects, with each conductor being adjacent no other than the mate of its pair, and a casing surrounding the conductors and having wide thin heat radiating surfaces close to and parallel to the wide surfaces of the conductors.

16. In a distribution system, a source of alternating current, a plurality of wide thin conductors connected thereto and arranged in a pattern of a plurality of definite and distinct pairs, each pair comprising two evenly and closely spaced conductors carrying currents of different phases, arranged wide face near wide face, the relative arrangement of and the spacing between the two conductors of a pair being small enough to permit the magnetic field effects of the currents in the conductors of the pair to neutralize one another, but the spacing being large enough to provide adequate relative insulated clearance between the conductors of the pair, the alternating current source being polyphase, with each phase distributed over two pairs, there being as many pairs as phases, the pairs being remotely spaced whereby there is a minimum of interpair magnetic effects, with each conductor being adjacent no other than the mate of its pair, and a casing surrounding the conductors and having wide thin heat radiating surfaces close to and parallel to the wide surfaces of the conductors.

17. In a polyphase distribution system, a source of polyphase alternating current, a plurality of wide thin conductors connected thereto and arranged in remotely spaced definite and distinct pairs, each pair comprising two evenly and closely spaced conductors of different phases, arranged wide face near wide face, each phase comprising two conductors of different pairs, the relative arrangement of and the spacing between the two conductors of a pair being small enough to permit the currents in the conductors of the pair to neutralize their relative magnetic effects but the spacing being large enough to provide adequate relative insulated clearance between the conductors of the pair. The spacing between the pairs being large enough to provide adequate heat dissipation from the pairs and satisfactory access between the pairs for tools and hands and fasteners used in joining and supporting the conductors, the spacing between pairs being considerably greater than the spacing between conductors of a pair.

18. In a polyphase distribution system, a source of polyphase alternating current, a plurality of wide thin conductors connected thereto and arranged in remotely spaced definite and distinct pairs, each pair comprising two evenly and closely spaced conductors of different phases, arranged wide face near wide face, each phase comprising two conductors of different pairs, the relative arrangement of and the spacing between the two conductors of a pair being small enough to permit the currents in the conductors of the pair to neutralize their relative magnetic effects but the spacing being large enough to provide adequate relative insulated clearance between the conductors of the pairs, the spacing between the pairs being large enough to provide adequate heat dissipation from the pairs and satisfactory access between the pairs for tools and hands and fasteners used in joining and supporting the conductors, the spacing between pairs being considerably greater than the spacing between conductors of a pair, the several conductors being arranged in two groups, each group comprising a conductor from each of the phases, each pair including a conductor from each of the groups.

19. In a polyphase distribution system, a source of polyphase alternating current, a plurality of wide thin conductors connected thereto and arranged in remotely spaced definite and distinct pairs, each pair comprising two evenly and closely spaced conductors of different phases, arranged wide face near wide face, each phase comprising two conductors of different pairs, the relative arrangement of and the spacing between the two conductors of a pair being small enough to permit the currents in the conductors of the pair to neutralize their relative magnetic effects but the spacing being large enough to provide adequate relative insulated clearance between the conductors of the pair, the spacing between the pairs being large enough to provide adequate heat dissipation from the pairs and satisfactory access between the pairs for tools and hands and fasteners used in joining and supporting the conductors, the spacing between pairs being considerably greater than the spacing between conductors of a pair, the several conductors being arranged in two rows, each row comprising a conductor from each of the phases, each pair including a conductor from each of the rows, with the conductors of one row directly above those of the other.

20. In a polyphase distribution system, a source of polyphase alternating current, a plurality of wide thin conductors connected thereto and arranged in remotely spaced definite and distinct pairs, each pair comprising two evenly and closely spaced conductors of different phases, arranged wide face near wide face, each phase comprising two conductors of different pairs, the relative arrangement of and the spacing between the two conductors of a pair being small enough to permit the currents in the conductors of the pair to neutralize their relative magnetic effects but the spacing being large enough to provide adequate relative insulated clearance between the conductors of the pair, the spacing between the pairs being large enough to provide adequate heat dissipation from the pairs and satisfactory access between the pairs for tools and hands and fasteners used in joining and supporting the conductors, the spacing between pairs being considerably greater than the spacing between conductors of a pair, the several conductors being arranged in two rows, each row comprising a conductor from each of the phases, each pair including a conductor from each of the rows, with the conductors of one row directly above those of the other, and an insulation barrier between the two rows of conductors.

21. In a polyphase distribution system, a source of polyphase alternating current, a plurality of wide thin conductors connected thereto and arranged in remotely spaced definite and distinct pairs, each pair comprising two evenly and closely spaced conductors of different phases, arranged wide face near wide face, each phase comprising two conductors of different pairs, the relative arrangement of and the spacing between the two conductors of a pair being small enough to permit the currents in the conductors of the pair to neutralize their relative magnetic effects but the spacing being large enough to provide adequate relative insulated clearance between the conductors of the pair, the spacing between the pairs being large enough to provide adequate heat dissipation from the pairs and satisfactory access between the pairs for tools and hands and fasteners used in joining and supporting the conductors, the spacing between pairs being considerably greater than the spacing between conductors of a pair, each pair carrying current in substantially equal amounts and of opposite directions, thus comprising a single phase transmission means.

22. In a polyphase distribution system, a source of polyphase alternating current, a plurality of wide thin conductors connected thereto and arranged in remotely spaced definite and distinct pairs, each pair comprising two evenly and closely spaced conductors of different phases, arranged wide face near wide face, each phase comprising two conductors of different pairs, the relative arrangement of and the spacing between the two conductors of a pair being small enough to permit the currents in the conductors of the pair to neutralize their relative magnetic effects but the spacing being large enough to provide adequate relative insulated clearance between the conductors of the pair, the spacing between the pairs being large enough to provide adequate heat dissipation from the pairs and satisfactory access between the pairs for tools and hands and fasteners used in joining and supporting the conductors, the spacing between pairs being considerably greater than the spacing between conductors of a pair, each conductor being a flat bar.

23. In a polyphase distribution system, a source of polyphase alternating current, a plurality of wide thin conductors connected thereto and arranged in remotely spaced definite and distinct pairs, each pair comprising two evenly and closely spaced conductors of different phases, arranged wide face near wide face, each phase comprising two conductors of different pairs, the relative arrangement of and the spacing between the two conductors of a pair being small enough to permit the currents in the conductors of the pair to neutralize their relative magnetic effects but the spacing being large enough to provide adequate relative insulated clearance between the conductors of the pair, the spacing between the pairs being large enough to provide adequate heat dissipation from the pairs and satisfactory access between the pairs for tools and hands and fasteners used in joining and supporting the conductors, the spacing between pairs being considerably greater than the spacing between conductors of a pair, each pair carrying current in substantially equal amounts and of opposite directions, thus comprising a single phase transmission means, each conductor being a flat bar.

24. In a distribution system, a source of alternating current, a plurality of wide thin conductors connected thereto and arranged in a pattern of a plurality of definite and distinct pairs, each pair comprising two evenly and closely spaced conductors carrying currents of different phases, arranged wide face near wide face, the relative arrangement of and the spacing between the two conductors of a pair being small enough to permit the magnetic field effects of the currents in the conductors of the pair to neutralize one another, but the spacing being large enough to provide adequate relative insulated clearance between the conductors of the pair.

25. In a distribution system, a source of alternating current, a plurality of wide thin conductors connected thereto and arranged in a pattern of a plurality of definite and distinct pairs, each pair comprising two evenly and closely spaced conductors carrying currents of different phases, arranged wide face near wide face, the relative arrangement of and the spacing between the two conductors of a pair being small enough to permit the magnetic field effects of the currents in the conductors of the pair to neutralize one another, but the spacing being large enough to provide adequate relative insulated clearance between the conductors of the pair, the alternating current source being polyphase, with each phase distributed over two pairs, there being as many pairs as phases.

26. In a distribution system, a source of alternating current, a plurality of wide thin conductors connected thereto and arranged in a pattern of a plurality of definite and distinct pairs, each pair comprising two evenly and closely spaced conductors carrying currents of different phases, arranged wide face near wide face, the relative arrangeemnt of and the spacing between the two conductors of a pair being small enough to permit the magnetic field effects of the currents in the conductors of the pair to neutralize one another, but the spacing being large enough to provide adequate relative insulated clearance between the conductors of the pair, the pairs being remotely spaced whereby there is a minimum of interpair magnetic effects, with each conductor being adjacent no other than the mate of its pair.

27. In a distribution system, a source of alternating current, a plurality of wide thin conductors connected thereto and arranged in a pattern of a plurality of definite and distinct pairs, each pair comprising two evenly and closely spaced conductors carrying currents of different phases, arranged wide face near wide face, the relative arrangement of and the spacing between the two conductors of a pair being small enough to permit the magnetic field effects of the currents in the conductors of the pair to neutralize one another, but the spacing being large enough to provide adequate relative insulated clearance between the conductors of the pair, the alternating current source being polyphase, with each phase distributed over two pairs, there being as many pairs as phases, the pairs being remotely spaced whereby there is a minimum of interpair magnetic effects, with each conductor being adjacent no other than the mate of its pair.

28. A construction of the character specified in claim 34, wherein the arrangement of the pairs is such that neutralization within a pair is not impaired by any other pair of the system.

29. A construction of the character specified in claim 24, wherein each conductor bounds a clear space large enough to provide adequate heat dissipation from it and from an adjacent conductor which also bounds that space with the space being large enough, where the conductors are joined and fastened, to provide satisfactory access to the two conductors bounding that space for tools and fasteners used in joining and supporting the conductors.

30. A construction of the character specified in claim 24, wherein the arrangement of the pairs is such that neutralization within a pair is not impaired by any other pair of the system, and wherein each conductor bounds a clear space large enough to provide adequate heat dissipation from it and from an adjacent conductor which also bounds that space with the space being large enough, where the conductors are joined and fastened, to provide satisfactory access to the two conductors bounding that space for tools and fasteners used in joining and supporting the conductors.

31. A construction of the character specified in claim 25, wherein the arrangement of the pairs is such that neutralization within a pair is not impaired by any other pair of the system.

ALVA A. TOGESEN.
LAWRENCE E. FISHER.